United States Patent [19]
Peiseler

[11] 4,364,204
[45] Dec. 21, 1982

[54] APPARATUS FOR MACHINING A NUMBER OF WORKPIECES WITH ONE TOOL

[76] Inventor: Franz F. Peiseler, Ronsdorfer Strasse 177, 5630 Remscheid, Fed. Rep. of Germany

[21] Appl. No.: 134,436

[22] Filed: Mar. 27, 1980

[30] Foreign Application Priority Data

Mar. 30, 1979 [DE] Fed. Rep. of Germany ....... 2912721

[51] Int. Cl.³ .............................. B23F 1/02; B23F 1/06
[52] U.S. Cl. ............................... 51/52 R; 51/105 GG; 51/287; 409/50
[58] Field of Search ...................... 409/41, 42, 56, 50, 409/131, 132; 51/105 GG, 32, 52 R, 72 R, 287, 95 GH

[56] References Cited

U.S. PATENT DOCUMENTS

1,584,308  5/1926  Konik ................................ 409/56
4,054,081 10/1977  Brown ............................... 409/132

Primary Examiner—Z. R. Bilinsky
Attorney, Agent, or Firm—Toren, McGeady & Stanger

[57] ABSTRACT

In order to increase its production rate, a grinding machine has two work tables situated one on each side of a grinding wheel. The tables each have a workpiece holder having a chuck which holds at least a workpiece. In this way the two workpieces can be ground simultaneously by the single grinding wheel. The chucks can be rotated step by step at the same instants as each other so that tooth gaps can be ground simultaneously on the two workpieces. The two tooth gaps, the shape and dimensions of which are dependent upon the profile of the grinding wheel, and which are ground simultaneously will be identical to each other.

3 Claims, 2 Drawing Figures

APPARATUS FOR MACHINING A NUMBER OF WORKPIECES WITH ONE TOOL

This invention relates to apparatus for machining a number of workpieces held in separate workpiece holders with one power-driven tool. Such apparatus makes it possible to carry out identical operations on several workpieces, for example in series production, in such a way that the rechucking and aligning of the workpiece and the tool necessary before the start of each machining operation is not carried out individually for each workpiece, but as a group after the preceding machining operation has been completed for all workpieces.

In known grinding machines, for example, the individual grinding operations take place one after another on individual workpieces, several workpieces being frequently ground simultaneously in one machine, but being ground by several tools one to each workpiece. This requires a correspondingly large number of tools. In the machining of several workpieces, for example by a grinding tool in a time sequence, a slight time advantage is thereby attained. Nevertheless, there is the disadvantage that the main machining time remains unaltered. Moreover, the finished dimensions of the different workpieces have different tolerances from one another. For example, when grinding a Hirth-type serration in toothed rings with a grinding tool fitting the flanks of the teeth in the tooth gaps, each individual tooth gap must be machined out.

With present procedures, however, only a limited time can be saved. The actual machining time, that is excluding idle time for rechucking and aligning tools and workpieces, remains the same for each machining operation, and the operations following one another in sequence do not permit a reduction in the main machining times.

The object of the present invention therefore is to provide an apparatus which substantially reduces the time taken for a machining operation on a number of workpieces and which permits increased dimensional accuracy for the workpieces machined in the machining operation.

To this end according to this invention, apparatus for machining a number of workpieces held in workpiece holders by means of a single tool has a number of workpiece holders each for holding at least a separate workpiece, the holders arranged to bring the workpieces at the same time as each other into engagement with different parts of the tool.

In this way, one and the same tool simultaneously machines several workpieces and the same tool-dependent dimensional tolerances inevitably result. The production rate thus rises, in conjunction with improved workpiece consistency, in dependance upon the number of workpieces disposed around the tool. For example, the production rate doubles when just two workpieces are disposed on opposite sides of the tool from each other.

The workpiece holders are preferably movable centripetally towards an axis of rotation of the tool, so that the workpieces held thereby can be brought up to the tool. The arrangement of the workpieces around a ring with the tool in the middle operating on all of the workpieces, instead of having the operations following one another in time, provides the advantage of simultaneous machining of all the workpieces. Thus the actual machining time is reduced.

The workpiece holders which are disposed around the tool can also be moved step by step in a direction parallel to the axes of rotation of a rotary tool so that the workpieces are brought one after another into engagement with the tool, which is, for example, a grinding wheel. Thus the workpiece holders, being moved step by step past the tool bring to the tool successive machining positions on one and the same workpiece or bring other workpieces to the tool to be similarly machined. For example, such workpiece holders make possible the grinding of a number of identical profiles at predetermined spacings on a single workpiece, and also the grinding of identical profiles on a number of workpieces one after another.

Such workpiece holders which can be moved step by step, for example rotary step by step movable tables, make possible automation of the workpiece feed and removal. If a workpiece is being machined when it is at the side of a rotary table adjacent a tool, a workpiece which has already been machined can be removed from the table at a position remote from the tool and a new workpiece can be mounted on the table while the machining operation is going on. With a workpiece feed automated in this manner, substantial idle time can be saved. The use of such workpiece holders with apparatus in accordance with the present invention provides a maximum amount of machining time with a corresponding reduction in idle time. Economy of production time is thereby assured.

Preferably the tool is surrounded by a plurality of toothed ring holders which are movable step by step past the tool. These toothed ring holders consist of rotary step by step tables and make possible at each step, for example, the grinding of one tooth gap in each toothed ring. Where the full cut method is used that is where a tooth gap is ground in a single pass, the toothed ring is completely ground after only one revolution of the table forming the toothed ring holder.

If the apparatus in accordance with the invention is provided with two toothed ring holders situated on opposite sides of the tool from each other, then, for example, in full cut grinding with a single trued grinding wheel, both the simultaneously machined tooth gaps receive identical profiles. Therefore, after the tooth ring has been assembled, those teeth which were simultaneouly ground lie alongside one another, provided that the two toothed rings are joined together in the orientation in which they were ground. The seating of toothed rings of this type thus achieves very high uniformity and accuracy.

The tool itself can also have a feed movement in addition to its cutting movement. Thus, a grinding wheel can be movable vertically normal to its axis of rotation, for example, by means of a grinding wheel headstock. Horizontal movement of the grinding wheel is also possible, as also is movement in all other planes. The apparatus in accordance with the present invention is consequently not restricted to machining in one specific plane.

The mobility of the grinding wheel makes possible grinding by the creep speed method or by the pendulum grinding method with numerous repetitions, high accuracy and grinding quality resulting therefrom. In form insert grinding, for example, the tooth gaps of a flat toothed ring are ground by the Hirth method obliquely to the plane of the ring. Grinding out of each individual tooth gap can be carried out in the apparatus in accordance with the invention simultaneously on a number of flat toothed rings clamped obliquely on toothed ring holders. Furthermore, workpieces such as toothed rings can also be machined by pulsating or scraping tools provided in apparatus in accordance with the invention. Thus a high surface quality of the machined surface can be obtained. In particular, there is effective utilization of the machining time and a higher production rate of workpieces.

An example of an apparatus in accordance with the invention, in the form of a grinding machine, will now be described with reference to the accompanying drawings, in which.

Figure 1:
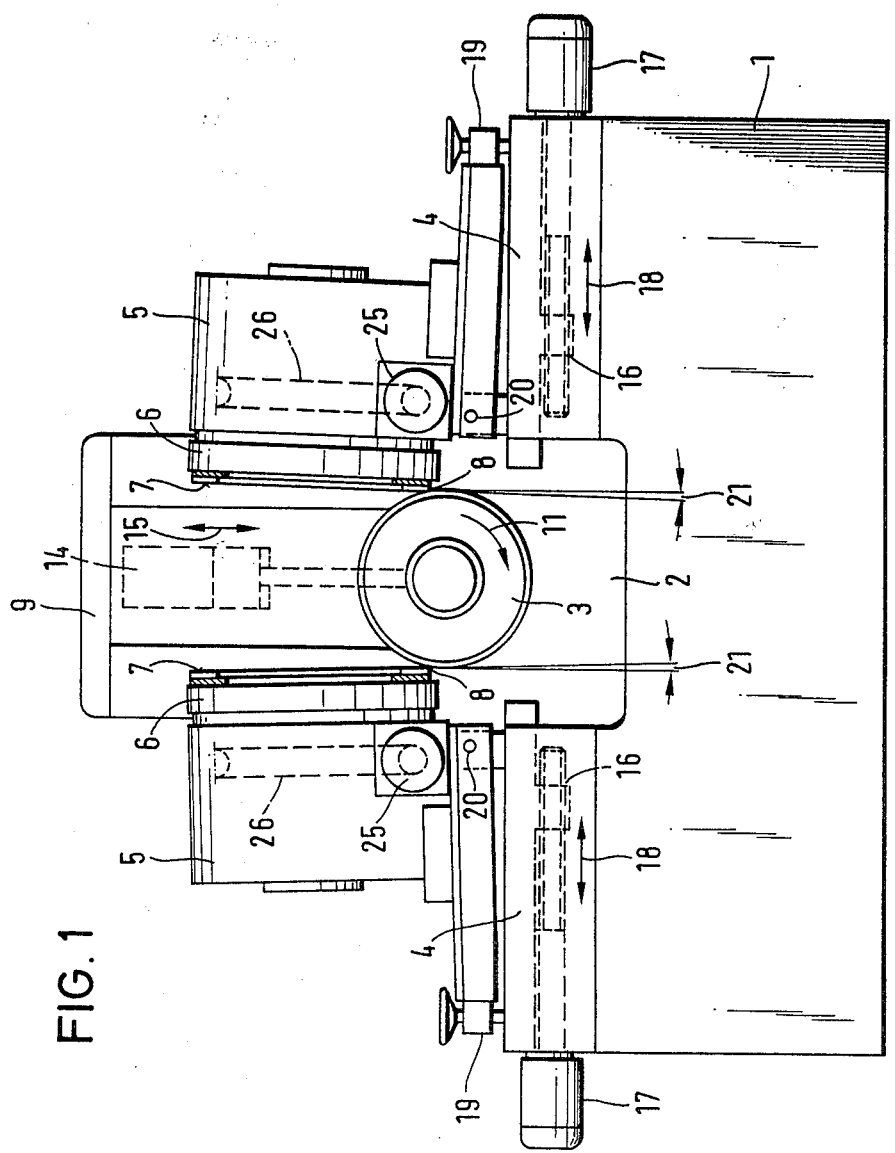
FIG. 1 is a front view of the machine with parts shown in section.
Figure 2:
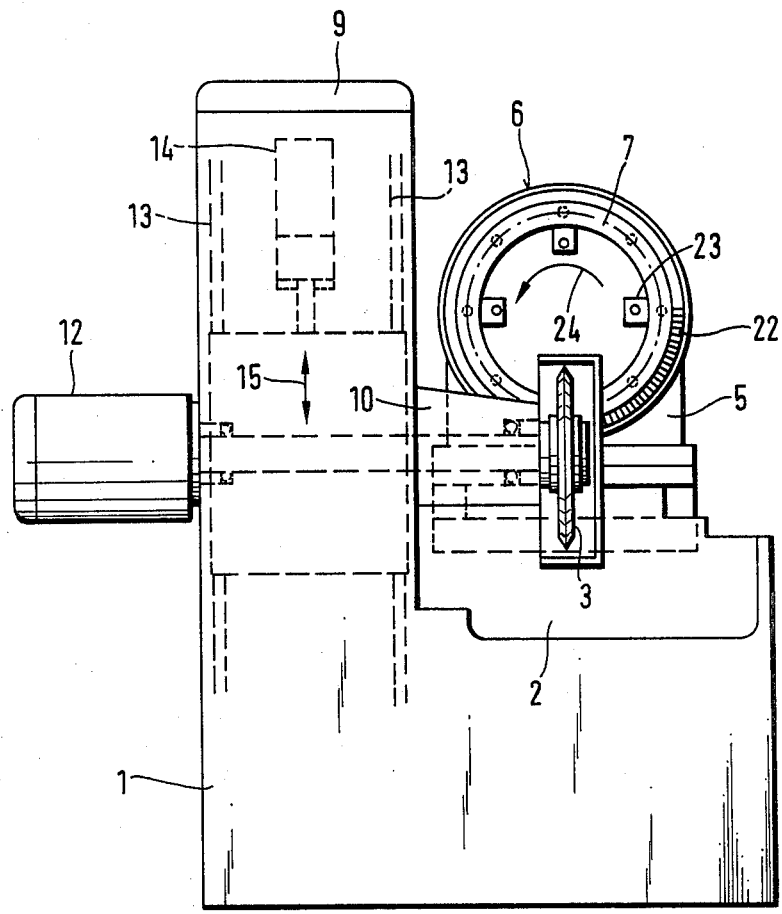
FIG. 2 is a side view of the machine with parts omitted.

A machine bed 1 carries two machine tables 4, separated from each other by a grinding space 2 of a grinding wheel 3. The tables 4 are movable towards each other and carry oppositely-handed toothed ring holders 5. Flat toothed rings 7 are mounted on step by step rotary workpiece tables 6 which engage at the grinding positions 8, the grinding wheel 3. The grinding wheel 3 is rotatably mounted on a headstock 10 which is vertically movable on a headstock pillar 9.

During the vertical grinding of flat toothed rings 7, the headstock 10 which carries the grinding wheel 3 is moved up and down in the grinding headstock pillar 9. The grinding wheel 3 thus travels over the grinding positions 8 of the flat toothed rings 7, which are pressed by an axial feed movement of the machine tables 4 against the grinding wheel 3 until the desired removal of material has been achieved.

Instead of being provided with a rotary tool such as the grinding wheel 3, apparatus in accordance with the invention may be provided with a linearly driven tool such as a planing tool or a scraping tool.

The grinding wheel 3 with the headstock 10 is connected with a—for example, continuously adjustable-rotationally movable drive 12 and movable up and down in the arrow direction 15, in the grinding spindle stand 9 in a guide 13 via a special drive 14. The machine tables 4 are movable towards each other, respectively synchronous in the arrow direction (18) via feeds 16 with drives 17. The tooth ring holders 5 are movable around a pivot 20 via an adjusting device 19, so that the milling angle 21 for the tooth gaps 22 of the plane-tooth rings 7 mounted with clamping jaws 23 on the workpiece tables 6 can be adjusted corresponding to the diameters of the rings. For stepwise movement past the workpiece tables 6 in rotational direction 24 at the grinding wheel 3, the workpiece tables 6 are respectively provided with a feed, for example, composed of a worm (-gear) 25 and worm wheel 26.

I claim:

1. In apparatus for machining face-type serrations in the planar end faces of a plurality of ring-shaped workpieces, comprising a single tool and power means for driving said tool wherein the improvement comprises that said tool is a grinding wheel having an axis of rotation, a plurality of workpiece holders, each of said holders arranged to hold at least a separate workpiece, means movably mounting said holders for moving said holders at the same time so that each of the workpieces can be moved at the same time in the direction toward and transversely of the axis of rotation of said grinding wheel whereby each of the workpieces moves into engagement with said grinding wheel, said holders are disposed in positions spaced apart around said grinding wheel, said means movably mounting said holders is operable to move said holders stepwise each in a separate plane parallel to the axis of rotation of said grinding wheel, means for mounting said grinding wheel for a feed movement and for moving said grinding wheel through said feed movement with the feed movement being a movement in addition to the machining movement of said grinding tool, said grinding wheel is circular and is rotationally driven for the machining movement, and means supporting said holders for adjusting the grinding angle between the planar end faces of the ring-shaped workpieces to be machined and said grinding wheel.

2. In apparatus for machining, as set forth in claim 1, wherein said plurality of workpiece holders comprises two said holders located on opposite sides of the axis of rotation of said grinding wheel, said means movably mounting said holders including means for holding the ring-shaped workpieces so that the workpieces can be moved step by step past said grinding wheel, and the number of steps through which said ring-shaped workpieces are moved by said means corresponds to the number of serrations to be machined in the planar end face of the workpiece.

3. In apparatus for machining, as set forth in claim 1, wherein said means mounting said grinding wheel for a feed movement moves said grinding wheel in a rectilinear direction.

* * * * *